United States Patent [19]

Lindenthal et al.

[11] Patent Number: 5,547,423

[45] Date of Patent: Aug. 20, 1996

[54] UNIVERSAL JOINT OF A CARDAN SHAFT SUITED FOR TRANSMISSION OF HIGH TORQUES

[75] Inventors: Hans Lindenthal, Heidenheim; Peter Grawenhof, Bernstadt, both of Germany

[73] Assignee: J.M. Voith GmbH, Heidenheim, Germany

[21] Appl. No.: 180,710

[22] Filed: Jan. 13, 1994

[30] Foreign Application Priority Data

Jan. 19, 1993 [DE] Germany .............. 43 01 178.0

[51] Int. Cl.$^6$ .................................................. F16D 3/41
[52] U.S. Cl. .................................................. 464/136
[58] Field of Search .................. 464/128, 130, 464/132, 136

[56] References Cited

U.S. PATENT DOCUMENTS

| | | | |
|---|---|---|---|
| 3,204,428 | 9/1965 | Stokely | 464/130 |
| 4,895,549 | 1/1990 | Lindenthal | 464/136 |

FOREIGN PATENT DOCUMENTS

| | | | |
|---|---|---|---|
| 2642964 | 3/1978 | Germany | 464/130 |
| 3644204C2 | 5/1989 | Germany . | |
| 1507480 | 9/1989 | U.S.S.R. | 464/132 |
| 2249818A | 5/1992 | United Kingdom . | |

Primary Examiner—Daniel P. Stodola
Assistant Examiner—Eileen A. Dunn
Attorney, Agent, or Firm—Baker & Daniels

[57] ABSTRACT

A universal joint attached to a cardan shaft and adapted for transmitting high torques. The universal joint includes two yokes, with each yoke having two bearing bores. A spider has a plurality of journals which are respectively disposed in the bearing bores. Each journal defines a corresponding journal axis, and has a journal bore defining an inner edge. The spider defines a joint axis extending generally perpendicular to each journal axis. A plurality of radial bearings are disposed within a respective bearing bore for rotatably supporting the journal within the bearing bore. Each radial bearing includes an inner race having a collar extending toward a respective journal axis. The collar extends radially inward of the inner edge and includes a first running face which faces toward the joint axis and parallel to the respective journal axis. A plurality of bearing caps are respectively disposed at an axial end of each journal. The bearing cap defines a second running face extending parallel to the first running face and facing away from the joint axis and parallel to the respective journal axis. An axial bearing is disposed within the journal bore, and is defined in part by the first running face and the second running face.

2 Claims, 2 Drawing Sheets

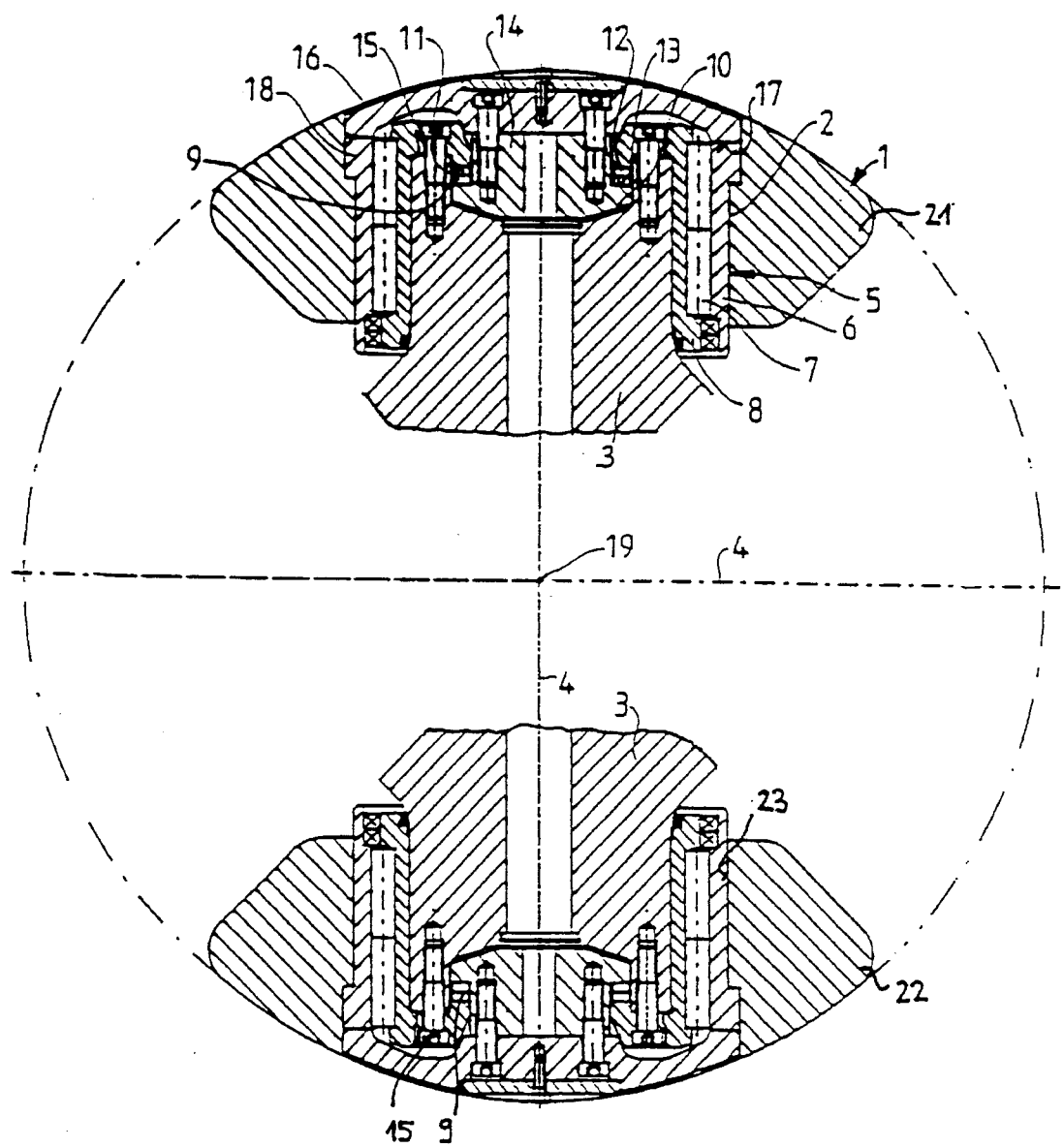

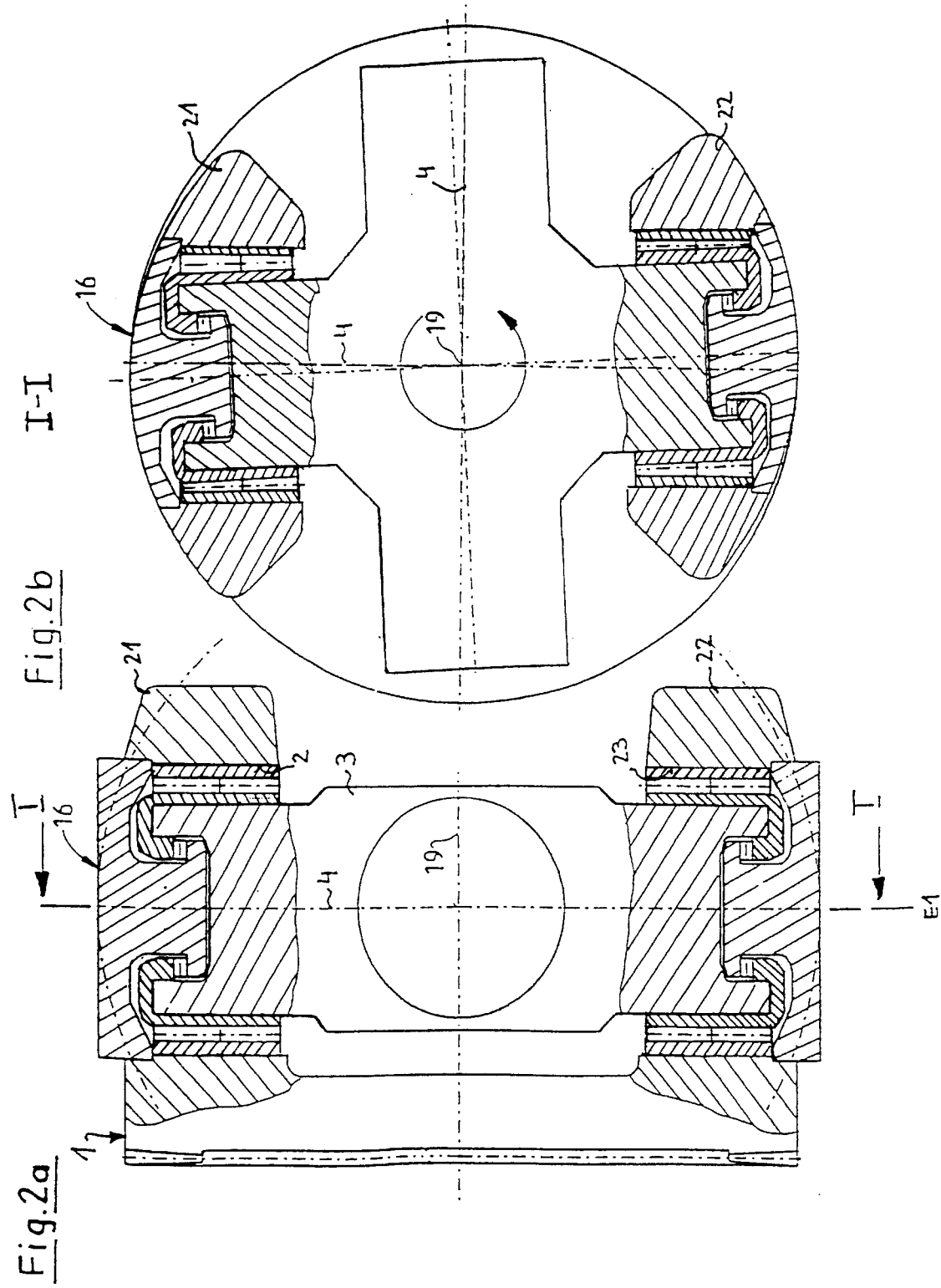

UNIVERSAL JOINT OF A CARDAN SHAFT SUITED FOR TRANSMISSION OF HIGH TORQUES

BACKGROUND OF THE INVENTION

The invention concerns a universal joint for a cardan shaft suited for transmission of high torque.

Conventional universal joints for a cardan shaft are known, e.g., from

1) German Patent Document 36 44 204 C2; and
2) British Patent Document 22 49 818 A.

When using cardan shafts suited for transmission of high torques in heavy machine construction, the universal joints—depending on the particular application—are exposed not only to high torques, but to a considerable extent also to transverse forces. Therefore, universal joints are equipped with radial bearings for transmission of peripheral forces and are equipped with axial bearings for absorption of transverse force. Generally, universal joints are supposed to possess, in addition to a high torque transmission capacity combined with a long bearing life, a minimal number of components of simple design and to involve low assembly expense. The transmission of high torques combined with a long bearing life presupposes the use of bearings with increased load capacity and, thus, larger bearing dimensions. These, in view of the limited space available, prove to be problematic.

From the German Patent Document 36 44 204 C2 it is previously known to relocate the axial bearing from its conventional location at the root of the journal to the end face of the journal, wherein the axial bearing bears on the radial bearing bush, which forms a unit with the journal, and on the inside surface of the bearing cap. The end face of the radial bearing bush is flush with the end face of the journal, i.e., it joins the end face of the journal in a plane, which further limits the construction space for the radial bearing, which in vertical direction is limited already by the design of the universal joint yoke and of the bearing cap.

The transverse force to be transmitted by the spider to the yoke, which with a respective angular position of the cardan shaft acts as an axial force in the direction of the journal axis away from the axis of the joint, extends from the end face of the journal through the inner race of the axial bearing and the axial bearing rollers to the other race to the bearing cap. The force, however, is not transmitted to the yoke of the universal joint along the shortest distance via the bearing cap, by means of screws, or via the shaft of the radial bearing outer race, by means of retaining rings, joined to the inside surface of the bearing cap. Rather, it is passed from the one bearing cap situated in the direction of force and not rigidly joined to the yoke half into the anchor joined to the bearing cap. The anchor is joined as well to the bearing cap on the opposite yoke half. The force bears there on the yoke with a working direction toward the axis of the joint. The bearing cap may bear also on the end face of the radial bearing outer race, provided the design of said race is such that it can be inserted from outside into the bearing bore up to a stop. Hence, a transverse force acting on the one bearing cap is not absorbed by that yoke eye against which the transverse force from the axis of the joint is directed, but by the opposite yoke eye. With this design of the universal joint, the loaded bearing is spared deformations in the area of the bearing bore in the yoke of the joint, thereby assuring optimum loadbearing performance in the axial bearing.

It is known that the length of the anchor is so chosen that both axial bearings will upon assembly of the caps to the anchor be subjected to a specific pre-stress. The pre-stress contributes to extensively avoiding, in the occurrence of a transverse acceleration without torque, axial backlash in the radial bearings in the direction of the journal axis, i.e., the relative movement of the anti-friction elements relative to the races of the radial bearing. With an axial force active, the anchor acts similar to an anti-fatigue-shaft bolt. Due to the force-dependent lengthening of the anchor, an axial displacement of the bearing cap in the eye of the yoke occurs in the working direction of the force, along the journal axis and away from the axis of the joint through the axial bearing. At the same time, the bearing cap which bears on the opposite yoke half is forced on the yoke eye, or respectively the yoke half. Owing to the axial displacement of the bearing cap, the contact pressure of the bearing cap on the opposite yoke half against the yoke of the joint, for introduction of the axial forces on the joint yoke, and due to the continual reciprocation of these operating conditions on one bearing cap, the end face and the inside surface of the bearing caps are exposed to heavy wear in the marginal regions. Contact corrosion, packing wear and frictional wear result in undesirable backlash.

British Patent Document 2 249 818 A teaches a universal joint design where the axial bearing is relocated from its conventional position of installation at the root of the journal, into a bore arranged on the inside of the journal. Arranging the axial bearing within the bore of the journal offers the advantage that the collar of the radial bearing bush can be made much longer, thereby gaining additional space for the anti-friction elements of the radial bearing. To assure an optimum load performance of the axial bearing, the bearing arrangement includes a backing ring which under load automatically adjusts elastically. With this design, the transverse and axial forces directed away from the joint axis are introduced in the yoke half at which the axial force also is directed. Disadvantages of this design include elevated expense of manufacture, assembly and maintenance, which expresses itself in increased cost. Also, achieving an optimum load performance of the axial bearing depends on the design of the backing ring.

The problem underlying the invention, therefore, is to provide a universal joint with a design such that the disadvantages of conventional designs will be avoided while achieving a reduction in number of components and assembly expense, as well as an increased bearing service life along with a simultaneous increase of the torques to be transmitted by the universal joint arrangement, by increased load capacity, especially of the dynamic load capacity, and thus an augmentation of the construction space available for the bearing. At the same time, the structural design is meant to be such that the axial forces will always bear on the yoke halves of the joint with a working direction toward the joint axis, that is, so that axial retainers for the individual bearing races will be dispensable and no force transmission elements will be necessary for transmitting the axial forces directed away from the joint axis along the shortest path to the yoke of the joint. This means that the axial force is introduced in the joint yoke always as a compressive force. The function guaranteed by the tie rod of DE 36 44 204 (transverse force support on the yoke half opposite the yoke half situated in the direction of force) and the specific pre-stress of the axial bearings is meant to be achieved through simpler design means, i.e., a universal joint design with fewer and more easily made components, which additionally allow an easier assembly. The wear occurring with conventional designs, due to axial displacement, on the end faces of the bearing caps and in the radial bearing is meant to be reduced.

SUMMARY OF THE INVENTION

The present invention provides a universal joint with an axial bearing which is relocated to a bore in the end face of the journal. The inventional structural design of the entire bearing arrangement has the effect that the axial forces which in the direction of the journal axis are directed away from the joint axis will always bear on the yoke half opposite the yoke half situated in the direction of force. The axial bearing situated in the working direction of the axial forces is relieved. The axial forces are passed into the joint yoke as compressive forces.

The axial bearings possess in their position of installation already a specific pre-stress, which is so chosen that axial backlash at axial bearing relief will under normal operating conditions be extensively avoided, i.e., that the pre-stress of a bearing will not be eliminated at its relief.

The wear on the end faces of the bearing caps and in the radial bearing, attributable to axial displacements, is reduced as compared to conventional universal joint bearings. A further advantage of the inventional solution consists in the reduction of the manufacturing and assembly expense, due to the small number of components of simple design.

BRIEF DESCRIPTION OF THE DRAWINGS

The inventional solution will be illustrated hereafter with the figures showing in FIG. 1: a cross section of a universal joint in a plane extending through the axis of the journal and perpendicular to the axis of the joint; and FIG. 2a, 2b: bearing cap designs showing the deformations occurring on the joint yoke and the individual bearings in the two-journal plane and in the four-journal plane.

DETAILED DESCRIPTION OF THE INVENTION

The universal joint according to FIG. 1 is comprised of a yoke 1 consisting of two yoke halves 21 and 22 in the bearing bores 2 and 23 of which a spider 3 is rotatably mounted by means of an antifriction bearing arrangement. The following description uses for the bearing design in the yoke halves 21 and 22 identical references for identical components. The journal axes 4 of the spider 3 may be arranged in one vertical plane or in two mutually parallel planes at an offset. The antifriction bearing assembly for each spider journal includes a radial bearing 5 with an outer race 6, rollers 7 and an inner race 8 fashioned as a collared bearing bush and of an axial bearing 9 arranged within a bore in the end face of the journal (journal bore) 10. Extending radially beyond the inner edge of journal bore 10 toward the journal axis, a collar of inner race 8 includes a collar face 11 which faces toward joint axis 19. Joint axis 19 extends in a direction generally perpendicular to the page on which FIG. 1 is illustrated. The rollers 12 of the axial bearing 9 roll on this collar face (running face) 11 and an outer running face 13 formed by an outer race 14 joined to the bearing cap. The collar face 11 protrudes preferably into the journal bore 10, but it may also be fashioned as a cantilevered extension of inner race 8.

Inner race 8 with the collar is pressed on the journal, and, for transmission of force, additionally secured to the journal by means of screw joints 15. The outer race 14 of the axial bearing is joined, by means of screw joints, to the bearing cap 16, which on its end, in the outer region, bears with the surface 17 on outer race 6 of radial bearing 5. Outer race 6 of radial bearing 5 can be slipped in along journal axis 4, toward the universal joint axis 19, up to a stop. As illustrated in FIG. 1, this stop may preferably be a shoulder or collar 18 defined by outer race 6 and facing away from the journal axis, collar 18 engaging joint yoke 1.

The axial forces created by the transverse acceleration acting in the direction of journal axis 4 away from joint axis 19, for instance in the direction of the yoke half 21, result in relieving the axial bearing 9 located in this direction and stressing the axial bearing which in the direction of the journal axis, opposite to the working direction of the axial forces, is located on the side of the joint yoke half 22. In this operational state, the relieved bearing may be called a passive bearing and the stressed bearing an active bearing. In this design, an axial force acting in the direction of the journal axis 4 away from the joint axis 19 in the direction of the yoke half 21 causes a negation of the tension forces acting in this direction on the screw joints and, thus, an axial displacement of the collar face 11 of the axial bearing. There is no transmission of force taking place through this axial bearing. At the same time, the screws of the screw joint 15 on the opposite yoke half 22 are subjected more so to tension stress, causing an addition of the tension force prevailing in the screw joint 15 and of the tension force acting on the journal. The additional tension force leads to a compressive stress of collar 18 of inner race 8. The axial force bears on yoke half 22, via collar 18 of inner race 8, which is stressed compressively, via axial bearing 9, via a component joined to the bearing cap 16 and serving as outer race 14 of the axial bearing 9, via bearing cap 16, which in the outer region bears with the face 17, endwise, on outer race 6 of radial bearing 5.

The deformation of the torque-transmitting components of a universal joint is in the peripheral direction of the force so extreme that an uneven load distribution will result in the bearing setup and only a fraction of the possible load capacity can be utilized. The lack of plane parallelity of the axial bearing races causes early fatigue of races and rolling elements and/or plastic deformations with their consequences (pitting and similar). On the other hand, the assured dynamic and static load ratings of the bearings are guaranteed by the bearing manufacturers only for a rigid design of the bearing joint. To guarantee plane parallelity of the axial bearing races at additionally active peripheral force, the inventional solution provides for making a bearing cap 16 similar to that shown in FIG. 2 of DE 36 44 204, but resistant to bending in the two-journal plane and flexible in the four-journal plane in the working direction of the peripheral force, or peripheral direction, of the universal joint.

FIG. 2a illustrates schematically the universal joint corresponding to FIG. 1, as viewed from the right. The spider 3 is rotatably mounted in the bearing bores 2 and 23 of the yoke halves 21 and 22. The joint axis 19 extends in the illustrated case through the intersection of the journal axes 4. Both journal axes are situated in a plane El. Bearing cap 16 is resistant to bending in this plane, that is, in the working direction of the axial force.

FIG. 2b presents schematically the behavior of the bearing cap 16 in the presence of peripheral force effect corresponding to view I—I of FIG. 2a, if the bearing cap 16 is fashioned elastic, or flexible, in this direction, i.e., in the peripheral direction of the joint. The plane parallelity of the axial bearing races is retained.

What is claimed is:

1. A universal joint for a cardan shaft and adapted for transmitting high torques, said universal joint comprising:

two yokes, each said yoke having two bearing bores;

a spider having a plurality of journals respectively disposed in said bearing bores, each said journal having a journal bore, each said journal further defining a corresponding journal axis, said spider defining a joint axis extending generally perpendicular to each said journal axis;

a plurality of radial bearings disposed within respective said bearing bores for rotatably supporting said journal within said bearing bore, each said radial bearing including an inner race having a collar extending toward a respective said journal axis, said collar further extending radially inward towards said journal axis and up into said journal bore and including a first running face which faces toward said joint axis;

a plurality of bearing caps respectively disposed at an axial end of each said journal;

a plurality of components joined respectively to said plurality of bearing caps, each said component including a shoulder defining a second running face extending parallel to a respective said first running face and facing away from said joint axis; and an axial bearing disposed within said journal bore, said axial bearing defined in part by said first running face and said second running face.

2. The universal joint of claim 1, wherein said bearing caps are flexible in a direction of rotation of the spider, and rigid in a direction corresponding to a respective journal axis.

* * * * *